United States Patent [19]

Tatami

[11] 4,393,412
[45] Jul. 12, 1983

[54] AUTOMATIC CHROMA LEVEL CONTROL CIRCUIT FOR COMPENSATING BOTH SLOW AND RAPID CHROMA LEVEL CHANGES

[75] Inventor: Mitsushige Tatami, Kanagawa, Japan

[73] Assignee: Sony Corporation, Tokyo, Japan

[21] Appl. No.: 171,452

[22] Filed: Jul. 23, 1980

[30] Foreign Application Priority Data

Jul. 25, 1979 [JP] Japan ............................... 54-94404

[51] Int. Cl.³ ............................................. H04N 9/49
[52] U.S. Cl. ................................................. 358/318
[58] Field of Search .................. 358/4, 8, 27, 318, 316

[56] References Cited

U.S. PATENT DOCUMENTS 4,041,526  8/1977  Kaneko ........................... 358/27 X
4,356,506 10/1982  Yamamitsu ........................ 358/316

Primary Examiner—Aristotelis M. Psitos
Attorney, Agent, or Firm—Hill, Van Santen, Steadman, Chiara & Simpson

[57] ABSTRACT

When levels of chrominance signals reproduced from a helical scan video tape recorder are controlled, two types of control signals are generated based on a level of color burst signal of the reproduced chrominance signals. One of the two control signals is responsive to relatively rapid level changes, and the other thereof is responsive to stationary errors based on head-tape contacting pressure changes during one revolution of a rotary video head.

9 Claims, 12 Drawing Figures

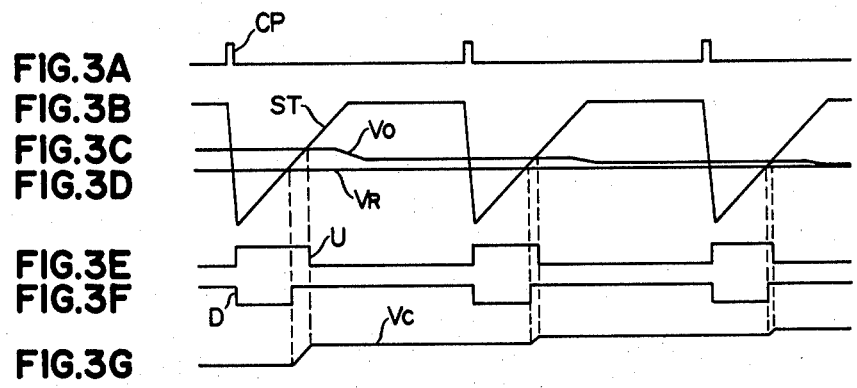
FIG.3A
FIG.3B
FIG.3C
FIG.3D
FIG.3E
FIG.3F
FIG.3G
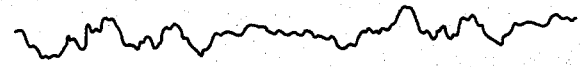
FIG.4A
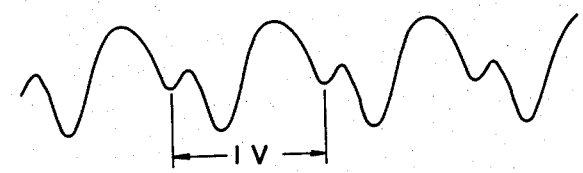
FIG.4B
FIG.4C

4,393,412

AUTOMATIC CHROMA LEVEL CONTROL CIRCUIT FOR COMPENSATING BOTH SLOW AND RAPID CHROMA LEVEL CHANGES

BACKGROUND OF THE INVENTION

This invention relates to an automatic level control system, and particularly to a chroma level control system installed in a color video tape recorder.

In a color video signal reproducing apparatus in which a magnetic tape and a rotary magnetic head are employed, signal levels of the reproduced video signal change based on tape tension, head-to-tape contacting pressure, etc. Particularly, when an NTSC type color video signal is directly converted into a FM video signal for recording, levels of the chrominance signal which occupy higher frequency regions are more influenced when reproduced.

Accordingly, it is very common to control the levels of the reproduced chrominance signals based on the comparison of a reproduced color burst signal and a reference signal.

According to a recent analysis of the level changes of the reproduced chrominance signals, there exist random level changes and standing-wave-like stationary level changes. The latter is thought to be generated cyclically based on changes of tape-head contacting pressure during one revolution of the video head. As is well-known, the video tape is run on a periphery of a tape guide drum in which the video head is installed. Usually, tape wrap angle in a helical scan video tape recorder is either 180° or near 360°.

In a conventional level control system, these level changes are controlled by a control signal generated at a single error detecting circuit. Therefore, the design of such a control circuit which had rapid response with adequate control gain is very difficult due to the signal-to-noise ratio of the control loop.

SUMMARY OF THE INVENTION

One object of this invention is to provide a new level control system.

Another object of this invention is to provide a novel chroma level control circuit for a color video signal.

According to the level control circuit of this invention, there are provided two types of error detecting circuits, one for rapid level changes and the other for standing-wave-like stationary level changes.

The chroma level control circuit of this invention is very useful for a reproduced composite color video signal from a helical scan video tape recorder.

As is well-known, contacting pressure between head and tape shows some variation during one revolution of the rotary magnetic head upon reproduction, and the reproduced level of signals is also influenced by such a pressure curve.

Such a stationary occurring level change is superimposed on a random level change.

According to the present invention, the random level change error is detected and generated using an error integrating type level comparator, and the stationary level change error is detected and generated using an error non-integrating type level comparator.

Such detections are provided by detecting the level of color burst signals which are representative of the levels of the reproduced chrominance signal.

For the above-described stationary level change errors, there are provided a plurality of capacitor memories corresponding to a segmented one field interval.

Various other objects, advantages and features of the present invention will become readily apparent from the ensuing detailed description.

BRIEF DESCRIPTION OF THE DRAWINGS

FIGS. 3A–3G, and FIGS. 4A–4C are waveforms of signals at the respective parts in FIG. 2.

DESCRIPTION OF THE PREFERRED EMBODIMENTS

Figure 1:
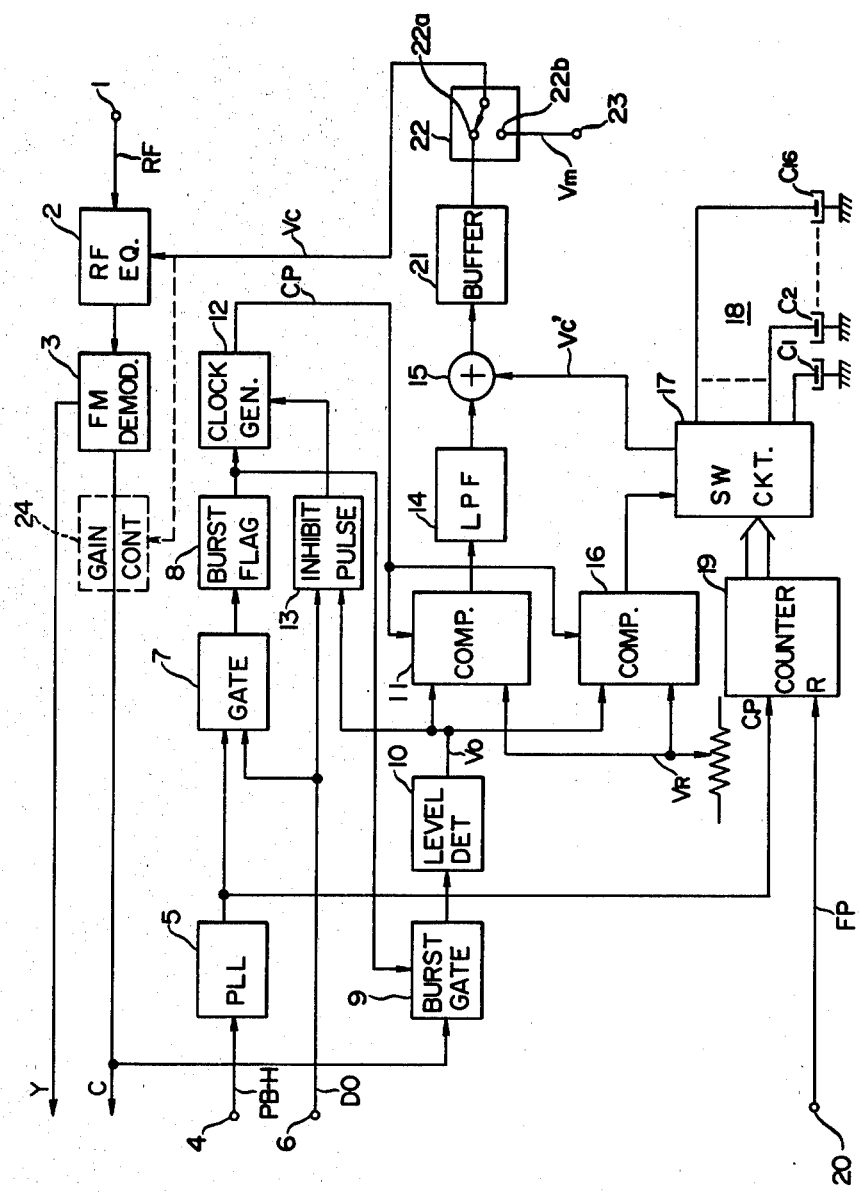
FIG. 1 is a block diagram of a chroma level control circuit according to one embodiment of this invention.

FIG. 1 shows a block circuit diagram of a chroma level control circuit according to one embodiment of the present invention, wherein a reproduced FM color video signal is supplied to an input terminal 1. As is well known, a composite NTSC color video signal is directly converted into an FM color video signal for recording when it is recorded on a video tape by a video tape recorder of broadcast type. The reproduced FM color video signal is also called "RF video", and this RF video is supplied through an RF equalizer 2 to an FM demodulator 3. A luminance signal Y and a chrominance signal C are obtained from the FM demodulator 3 which includes a luminance-chrominance separator in this embodiment. A level control signal $V_c$ supplied to the RF equalizer 2 is formed by comparing a color burst level contained in the chrominance signal with a reference level.

A reproduced horizontal synchronizing signal PB-H, separated from the reproduced luminance signal Y, is supplied to a PLL (Phase-Locked Loop) circuit 5 through an input terminal 4. Phantom pulses which might occur due to misoperation of a synchronizing signal separator is compensated by the PLL circuit 5. Thus, continuous horizontal synchronizing signals are obtained from the PLL circuit 5. The output of the PLL circuit 5 and a drop-out signal $D_o$ obtained from an input terminal 6 by detecting a defect of the reproduced luminance signal are supplied to a gate circuit 7. Thus, a noiseless horizontal synchronizing pulse is obtained from the gate circuit 7, and it is supplied to a burst flag generator 8. A burst flag pulse is formed by the burst flag generator 8. When the drop-out signal $D_o$ is generated, the output of the gate circuit 7 becomes zero, and the burst flag pulse is not formed. The burst flag pulse is supplied to a burst gate 9. A color burst signal is separated from the reproduced chrominance signal in the burst gate 9.

The level of the color burst signal is detected by a level detector 10. The output Vo of the level detector 10 is compared with a reference level $V_R$ by a level comparator 11. An error integrating type comparator to be described hereinafter is used for the level comparator 11. A clock pulse CP of a predetermined frequency required by the comparator 11 for the comparison is generated by a clock pulse generator 12 in synchronization with the burst flag pulse. When the burst detecting signal Vo is zero or the drop-out signal Do is generated, an inhibit pulse is formed by an inhibit pulse generator 13. The output of the clock pulse generator 12 is suppressed by the inhibit pulse. Thus, any level other than the true burst signal level is suppressed from being compared with the reference level.

The error integrating type comparator 11 operates so as to feedback the residual error, so that the resultant residual error becomes nearly equal to zero, although its gain is not infinitely high. Accordingly its equivalent DC gain is very high, and the noise level in a high frequency region becomes very low. An error signal from the level comparator 11 is supplied to a low pass filter 14 having a relatively short time constant. A control voltage responsive to relatively rapid change of the burst level is thus obtained from the low pass filter 14 and is supplied to an adder 15.

In a conventional chroma level control circuit, a normal non-integrating type comparator is used for the level comparator. Accordingly a low pass filter having a long time constant is used for lowering noise level of the comparing output. In that case, it is difficult to control relatively rapidly changing chroma level.

On the other hand, the level comparator 11 is of the error integrating type, and the control voltage is responsive to rapid level change. Further, another level comparator 16 is arranged for obtaining another control voltage for the stationary level error. A relatively slowly changing level is controlled by this control voltage. In this case, the level comparator 16 is of the non-integrating type.

An output of the level comparator 16 is supplied through a switching circuit 17 to a memory circuit 18 consisting of capacitors $C_1$ to $C_{16}$. The memory circuit 18 functions also as loop filter, and it has such a long time constant (for example, 1 to 2 seconds) as to eliminate relatively rapidly changing components. In this example shown in FIG. 1, the time of one field is divided into sixteen segments. Control voltages for the respective periods (about sixteen scanning lines) are stored in the capacitors $C_1$ to $C_{16}$, respectively.

The switching circuit 17 is controlled with an output of an address counter 19 which counts a horizontal sync pulse obtained at the output of the PLL circuit 5, and is reset by a field pulse FP supplied from an input terminal 20. An address signal of four bits is obtained from the address counter 19. The number of the capacitors for the memory circuit 18 may be thirty-two or sixty-four in place of sixteen. The larger the number of capacitors the more closely the standing-wave-like changes of the chroma level may be followed.

The control voltage responsive to the standing-wave-like change in the rotary frequency of the rotary head is obtained from the memory circuit 18, and it is added to the other control voltage responsive to the rapid change of the level supplied from the low pass filter 14 in an adder 15. The output of the adder 15 is supplied as a control voltage $V_c$ through a contact 22a of a changeover switch 22 for automatic/manual function, to a control terminal of the RF equalizer 2. When the switch 22 is changed over to a manual side contact 22b, a manual control voltage $V_m$ from an input terminal 23 is supplied to the RF equalizer 2.

For example, the RF equalizer 2 may comprise a delay circuit for delaying the reproduced RF signal by time $\tau$, a buffer amplifier for amplifying the RF signal K-times, and a differential amplifier for subtracting the output of the buffer amplifier from the output of the delay circuit so that an output having the amplitude-frequency of $(1-K\cos\omega\tau)$ is obtained from the differential amplifier, and the amplitude of the RF signal is adjusted by the value of K.

As shown by the dotted line in FIG. 1, the control voltage $V_c$ may be supplied to a gain control circuit 24 instead of RF equalizer 2 for controlling the level of the reproduced chroma signal C obtained from the FM demodulator 3.

Figure 2:
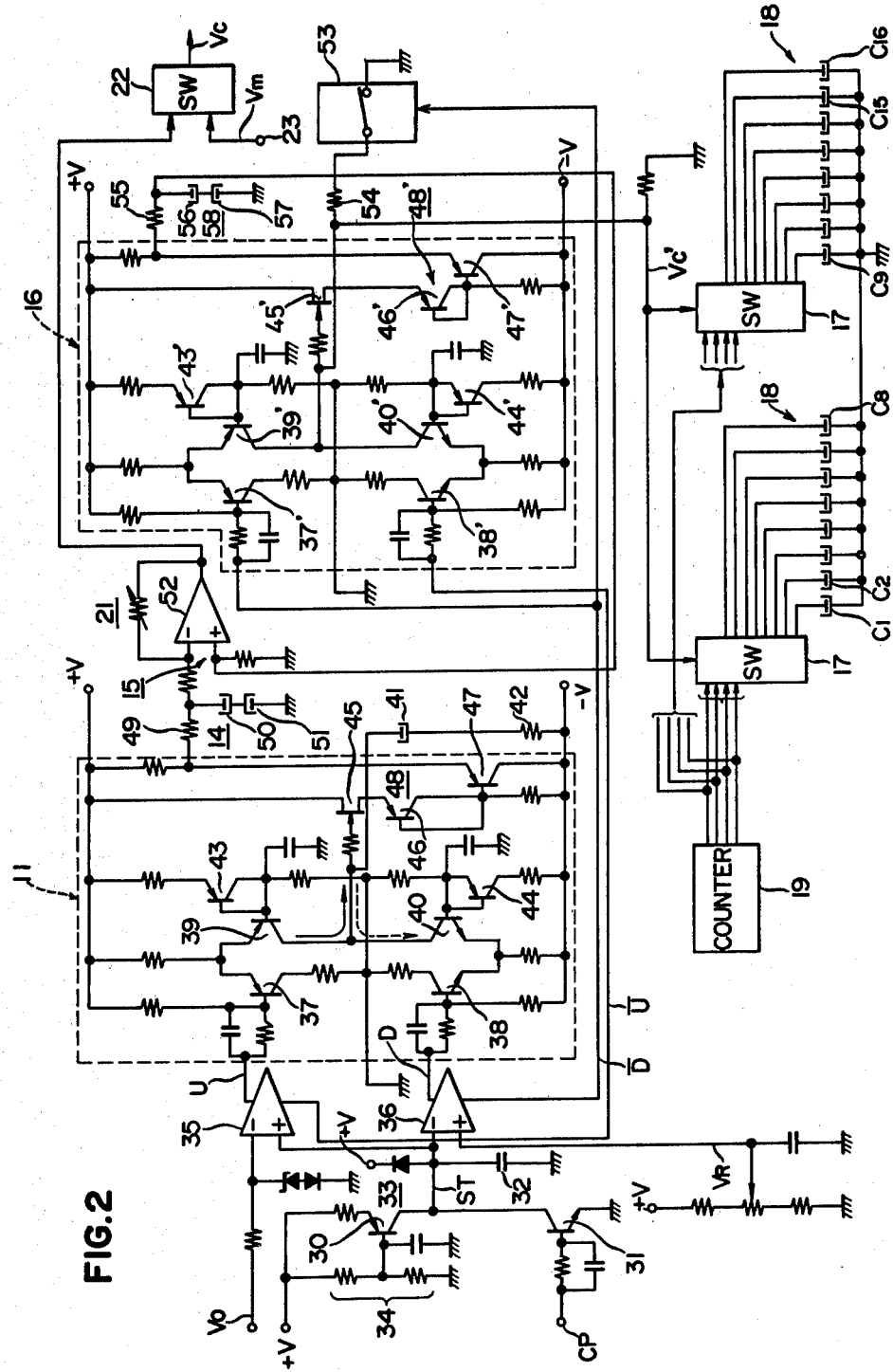
FIG. 2 is a circuit diagram of level comparators of the circuit diagram in FIG. 1.

FIG. 2 shows detailed circuit diagrams of the level comparators 11 and 16 shown in FIG. 1, and FIG. 3 and FIG. 4 show waveforms of signals at the respective parts in FIG. 2.

In FIG. 2, a trapezoidal wave generator 33 is formed by transistors 30, 31 and a capacitor 32. A constant voltage is supplied through a voltage divider 34 to a base of the transistor 30. Accordingly, the capacitor 32 is charged through the transistor 30 with a constant current. The terminal voltage of the capacitor 32 changes at a predetermined slope as shown in FIG. 3B. On the other hand, clock pulses CP as shown in FIG. 3A from the clock pulse generator 12 shown in FIG. 1 are supplied to a base of the transistor 31 to discharge the capacitor 32. Thus, a trapezoidal wave ST shown in FIG. 3B is obtained from the terminal of the capacitor 32.

The trapezoidal wave ST is supplied to a non-inverting input of a voltage comparator 35 and to an inverting input of another voltage comparator 36. Furthermore, the output voltage $V_o$ of the level detector 10 shown in FIGS. 1 and 3C and assumed to be higher than $V_R$ is supplied to an inverting input of the voltage comparator 35, and the reference voltage $V_R$ shown in FIG. 3D is supplied to a non-inverting input of the other voltage comparator 36. Accordingly, the levels of the output voltage $V_o$ and reference voltage $V_R$ are modulated as pulse widths by the voltage comparators 35 and 36. Thus, a positive pulse U shown in FIG. 3E is obtained from the voltage comparator 35 and, a negative pulse D shown in FIG. 3F is obtained from the other voltage comparator 36. The pulses U and D are supplied to transistors 37 and 38, respectively. The transistor 37 is placed in the OFF state in the period when the pulse U is at higher level, and the other transistor 38 is placed in the OFF state in the period when the pulse D is at lower level. When the transistors 37 and 38 are placed in the OFF state, transistors 39 and 40 paired with the transistors 37 and 38 are placed in the ON state to charge and discharge a holding circuit consisting of a capacitor 41 and a resistor 42 as shown by the solid arrow and dotted arrow in FIG. 2, respectively. The charging current and discharging current are regulated by emitter currents or base voltages of transistors 43 and 44. They are equal to each other.

The capacitor 41 is charged with a voltage corresponding to the difference between the pulse widths of the pulses U and D. The terminal voltage of the capacitor 41 is supplied through a buffer circuit 48 consisting of transistors 45, 46 and 47 to the low pass filter 14 consisting of a resistor 49 and capacitors 50 and 51. The output of the low pass filter 14, as shown in FIG. 4A, is supplied to an inverting input of an operational amplifier 52 which constitutes the adder 15 and buffer circuit 21 shown in FIG. 1.

The output of the operational amplifier 52 is supplied as the control voltage $V_c$ as shown in FIG. 3G, through the switching circuit 22 to the RF equalizer 2 to control the reproduced chroma signal level.

When the burst detecting output $V_o$ is at a level shown in FIG. 3C, the pulse width of the positive pulse U is longer than that of the negative pulse D, as shown in FIG. 3E and FIG. 3F, and so the control voltage $V_c$ increases with the sampling operations, as shown in FIG. 3G. Accordingly, the output $V_o$ of the level detector 10 decreases as shown in FIG. 3C and approaches the reference voltage $V_R$, so the pulse width of the positive pulse U approaches that of the negative pulse D. Thus, the change of the control voltage $V_c$ decreases with time, and approaches indefinitely to a constant value. The detecting output $V_o$ approaches indefinitely the reference voltage $V_R$. In the stationary state, the output $V_o$ is equal to the reference voltage $V_R$, and so the residual error becomes zero.

A process for the stationary state in the case when the reference voltage $V_R$ is larger than the detecting output $V_o$ ($V_R > V_o$), or when the pulse width of the negative pulse D is longer than that of the positive pulse U, is similar to the above described process.

In the level comparator 11, the levels of the burst detecting output $V_o$ and the reference voltage $V_R$ modulate the pulses U and D, respectively. The capacitor 41 is charged and discharged with the voltage corresponding to the difference between the pulse widths of the pulses U and D. Thus, the comparison result $V_c$ is obtained between the detecting output $V_o$ and the reference voltage $V_R$, and it is stored in the capacitor 41 with the sampling. The control voltage $V_{c(n)}$ obtained by the n-th sampling is expressed by the following formula:

$$V_{c(n)} = V_{c(n-1)} + K \cdot (V_R - V_{o(n)}) \quad (1),$$

where K is constant, $V_{c(n-1)}$ represents a control voltage obtained by the (n−1)-th sampling, and $V_{o(n)}$ represents a detecting output obtained by the n-th sampling.

When there is difference between $V_R$ and $V_o$ in the equation (1), $V_{c(n)}$ changes from $V_{c(n-1)}$. With the change, the chroma level of the output of the RF equalizer 2 changes so that the burst detecting output $V_o$ approaches the reference voltage $V_R$. In the converged condition, the reference voltage $V_R$ is equal to the burst detecting output, and $V_{c(n)}$ is equal to $V_{c(n-1)}$. Thus, the control loop becomes stable. The residual error ($V_R - V_o$) is zero.

Accordingly, the residual error of the level comparator 11 is zero irrespective of the value of the comparison gain K in the equation (1), or even when the value of the comparison gain K is small. Accordingly, the DC gain of the comparator 11 can be equivalently very high. When the value of the comparison gain K is small, the high frequency noise level is lowered. The filtering region of the low pass filter 14 is widened. The control voltage $V_c$ as the output of the low pass filter 14 can follow relatively rapid changes of the burst level as shown in FIG. 4A.

On the other hand, negative-phase outputs U and D of the comparators 35 and 36, which operate as pulse width modulators, are supplied to another level comparator 16. The level comparator 16 is similar to the one level comparator 11 in circuit construction. However, in contrast to the level comparator 11, capacitors $C_1$ to $C_{16}$, constituting a memory circuit 18, are charged with the pulse D, and discharged with the pulse U. The voltages corresponding to the difference between the pulse widths of the pulses D and U are stored in time-sharing fashion in the capacitors $C_1$ to $C_{18}$ in order. The output of the comparator 16 is opposite to the output of the comparator 11 in phase.

The reference pulse D is supplied to a switching circuit 53 to turn on the latter. Accordingly, the holding voltage of the memory circuit 18 is discharged through a resistor 54 at a predetermined time constant. As the result, the voltage corresponding to the difference between the burst detecting output $V_o$ and the reference voltage $V_R$ does not remain in the capacitors $C_1$ to $C_{16}$, but is renewed at every sampling. Thus, the level comparator 16 functions as a non-integrating comparator. Accordingly, when the output of the integrating comparator 11 is added to the output of the comparator 16 in the adder 15, there is no mutual interference between the outputs of the comparators 11 and 16.

A relatively slow standing-wave-like change in one field period, as shown in FIG. 4B, is memorized in the memory circuit 18 consisting of the capacitors $C_1$ to $C_{16}$. The output $V_c'$ of the memory circuit 18 is supplied through a switching circuit 17, a buffer circuit 48' consisting of transistors 45', 46' and 47', and a low pass filter 58 consisting of a resistor 55 and capacitors 56 and 57, to a non-inverting input of the operational amplifier 52, and is compared there with the output of the comparator 11 shown in FIG. 4A. The output of the operational amplifier 52 as shown in FIG. 4C is supplied as the control voltage $V_c$ through the switching circuit 22 to the RF equalizer 2. As a result, the amplitude-frequency characteristic of the RF equalizer is adjusted with respect to the relatively rapid change of the chroma signal level and the relatively slow standing-wave-like change thereof. Thus, a reproduced picture of high quality can be obtained.

As above described, the reproduced chroma signal level is compared with the reference level. The comparison result is time-sharingly held in the group of capacitors. The reproduction characteristic of the chroma signal is adjusted with the output of the group of capacitors. Thus, the standing-wave-like change of the chroma signal due to the variations of the head-tape contacting pressure in one revolution of the head drum is detected and is retained. Accordingly, the level control signal which closely follows the standing-wave-like change is obtained by the circuit of the embodiment of this invention.

While this invention is illustrated with specific embodiment, it will be recognized by those skilled in the art that modifications may be made therein without departing from the true scope of the invention.

I claim as my invention:

1. An automatic chroma control circuit for compensating rapid and slow chroma level changes of chrominance signals reproduced from a video tape recorder, comprising:
    means for deriving color burst signals which are representative of levels for said reproduced chrominance signals;
    means connected to said color burst signal deriving means for detecting relatively rapid changes in the envelope level of the reproduced chrominance signals;
    means connected to said color burst signal deriving means for detecting relatively slow changes in envelope level of the reproduced chrominance signals;
    means for generating a chrominance level control signal by combining outputs of said means for detecting rapid level changes and means for detecting slow level changes of the reproduced chrominance signals; and
    means for controlling amplitudes of said reproduced chrominance signals in response to said control signal derived from said chrominance level control signal generating means.

2. An automatic chroma control circuit according to claim 1 wherein said means for detecting relatively slow changes comprises a plurality of memories, and said relatively slow level changes being memorized in each of said memories in segmented form.

3. An automatic chroma control circuit according to claim 1 wherein said means for detecting relatively rapid level changes includes an error integrating type level comparator.

4. An automatic chroma level control circuit according to claim 3, wherein said error integrating type level comparator includes a charge pump type circuit.

5. An automatic chroma control circuit according to claim 2, wherein one field of video signal is segmented into a plurality of regions, each of said plurality of memories corresponding to each of said regions.

6. The circuit of claim 5 wherein the memories comprise capacitors.

7. An automatic chroma control circuit comprising:
a video tape recorder having an output with color video signals from which chrominance signals can be reproduced;
means for reproducing chrominance signals from the video tape recorder color video signals;
means for deriving color burst signals from the reproduced chrominance signals which are representative of levels for said reproduced chrominance signals;
means connected to said color burst signal deriving means for detecting random relatively rapid level changes of the reproduced chrominance signals;
means connected to said color burst signal deriving means for detecting relatively slow cyclical standing-wave-like level changes of the reproduced chrominance signals;
means for generating a chrominance level control signal by adding outputs of said means for detecting rapid level changes and said means for detecting relatively slow level changes; and
means for utilizing the chrominance level control signal to control amplitudes of the reproduced chrominance signals.

8. An automatic chroma control circuit comprising:
a video tape recorder having an output with color video signals from which chrominance signals can be reproduced;
means for reproducing chrominance signals from the video tape recorder color video signals;
means for deriving color burst signals from the reproduced chrominance signals which are representative of levels for said reproduced chrominance signals;
means connected to said color burst signal deriving means for detecting relatively rapid level changes of the reproduced chrominance signals;
means connected to said color burst signal deriving means for detecting relatively slow level changes of the reproduced chrominance signals;
means for generating a chrominance level control signal by combining outputs of said means for detecting rapid level changes and said means for detecting relatively slow level changes;
means for utilizing the chrominance level control signal to control amplitudes of the reproduced chrominance signals; and
said means for detecting relatively slow level changes comprising a plurality of memory element means for memorizing the relatively slow chroma level changes.

9. The circuit of claim 8 wherein the relatively fast level changes comprise random level changes and the relatively slow changes comprise standing-wave-like level changes cyclically occurring.

* * * * *